(12) United States Patent
Buruganahalli et al.

(10) Patent No.: US 9,838,434 B2
(45) Date of Patent: *Dec. 5, 2017

(54) CREATING AND MANAGING A NETWORK SECURITY TAG

(71) Applicant: McAfee, LLC, Santa Clara, CA (US)

(72) Inventors: Shivakumar Buruganahalli, San Jose, CA (US); Manuel Nedbal, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,524

(22) Filed: Dec. 31, 2015

(65) Prior Publication Data

US 2016/0226916 A1 Aug. 4, 2016

Related U.S. Application Data (63) Continuation of application No. 13/976,303, filed as application No. PCT/US2013/032433 on Mar. 15, 2013, now Pat. No. 9,231,976.

(51) Int. Cl.
G06F 17/00 (2006.01)
H04L 29/06 (2006.01)

(52) U.S. Cl.
CPC .......... *H04L 63/20* (2013.01); *H04L 63/0428* (2013.01); *H04L 63/1433* (2013.01); *H04L 63/14* (2013.01)

(58) Field of Classification Search
CPC .................................................. H04L 63/145
USPC ............................................................ 726/1
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,845,007 B1 | 11/2010 | Kennis | |
| 8,289,854 B1 | 10/2012 | Nedbal et al. | |
| 2002/0191605 A1 | 12/2002 | Lunteren et al. | |
| 2004/0218603 A1* | 11/2004 | Lee | H04L 12/1836 370/390 |
| 2007/0156831 A1* | 7/2007 | Quine | G06Q 10/107 709/206 |

(Continued)

OTHER PUBLICATIONS

International Search Report and Written Opinion in International Application No. PCT/US2013/032433, dated Dec. 12, 2013, 9 pages.

*Primary Examiner* — Taghi Arani
*Assistant Examiner* — Khalil Naghdali
(74) *Attorney, Agent, or Firm* — Patent Capital Goup (57) ABSTRACT

An apparatus, computer readable medium, and method are provided in one example embodiment and include a network device, an analysis module, and a tag module. The analysis module may be configured to perform a number of actions on the network data to identify network information about the network data. The tag module may be configured to determine whether a destination for the network data is within a set of destinations; and responsive to a determination that the destination for the network data is within the set of destinations: generate a metadata tag based on the network information, associate the metadata tag with the network data, and transmit the network information and the metadata tag.

22 Claims, 6 Drawing Sheets

(56) References Cited

U.S. PATENT DOCUMENTS

| | | |
|---|---|---|
| 2007/0165603 A1 | 7/2007 | Yokobori et al. |
| 2008/0201299 A1 | 8/2008 | Lehikoinen et al. |
| 2009/0288141 A1* | 11/2009 | Khachaturov ........ G06F 21/577 |
| | | 726/3 |
| 2011/0047597 A1* | 2/2011 | Mahaffey ............. G06F 21/564 |
| | | 726/3 |
| 2011/0196911 A1 | 8/2011 | de la Iglesia et al. |
| 2011/0249572 A1 | 10/2011 | Singhal et al. |
| 2012/0174186 A1 | 7/2012 | Aziz et al. |
| 2013/0058354 A1* | 3/2013 | Casado ............... H04L 12/4633 |
| | | 370/401 |
| 2013/0067560 A1 | 3/2013 | Zuk et al. |
| 2013/0219078 A1* | 8/2013 | Padmanabhan ..... G06F 9/45558 |
| | | 709/238 |
| 2014/0029617 A1 | 1/2014 | Wang et al. |
| 2014/0105216 A1 | 4/2014 | Mcdysan |
| 2014/0108820 A1 | 4/2014 | Eynon et al. |
| 2014/0282843 A1 | 9/2014 | Buruganahalli et al. |

* cited by examiner

CREATING AND MANAGING A NETWORK SECURITY TAG

CROSS-REFERENCE TO RELATED APPLICATIONS

This application is a continuation (and claims the benefit under 35 U.S.C. §120) of previously filed U.S. patent application Ser. No. 13/976,303, filed Dec. 26, 2013, entitled "Creating and Managing a Network Security Tag," which application is a national stage filing under 35 U.S.C. §371 of International Application No. PCT/US2013/032433, filed Mar. 15, 2013, entitled "Creating and Managing a Network Security Tag," all of which are incorporated herein by reference in their entireties.

TECHNICAL FIELD

This disclosure relates in general to the field of networks, and more particularly, to creating and managing a network security tag in a network environment.

BACKGROUND

Computer networks continue to become more complex. Users of computer networks frequently use applications that cause network devices to send and receive data to many different network devices. The data may travel through a number of different networks and network devices before reaching the final destination for the data. Network devices may be capable of receiving and sending data across different types of networks. Such devices may be used for routing data to the final destination for the data, such as routers and switches. Such devices may also be used to prevent unauthorized access to applications and data, such as firewalls, authentication servers, and proxy servers. Further, such devices may be used to prevent unauthorized data from being transmitted through the network, such as antivirus servers, data capture servers, and security compliance servers.

Enterprise or Cloud is a complex implementation of network devices, security devices, server devices, and virtualized environments distributed across geographical borders, such as, for example, routers, switches, firewalls, intrusion protection systems, data capture devices, authenticating servers, Web caches, accelerators, decryption proxies, compliances, storage servers, and server farms. Various network devices may analyze network data as it traverses from the perimeter towards the core of an enterprise network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Example Embodiments

Figure 1:
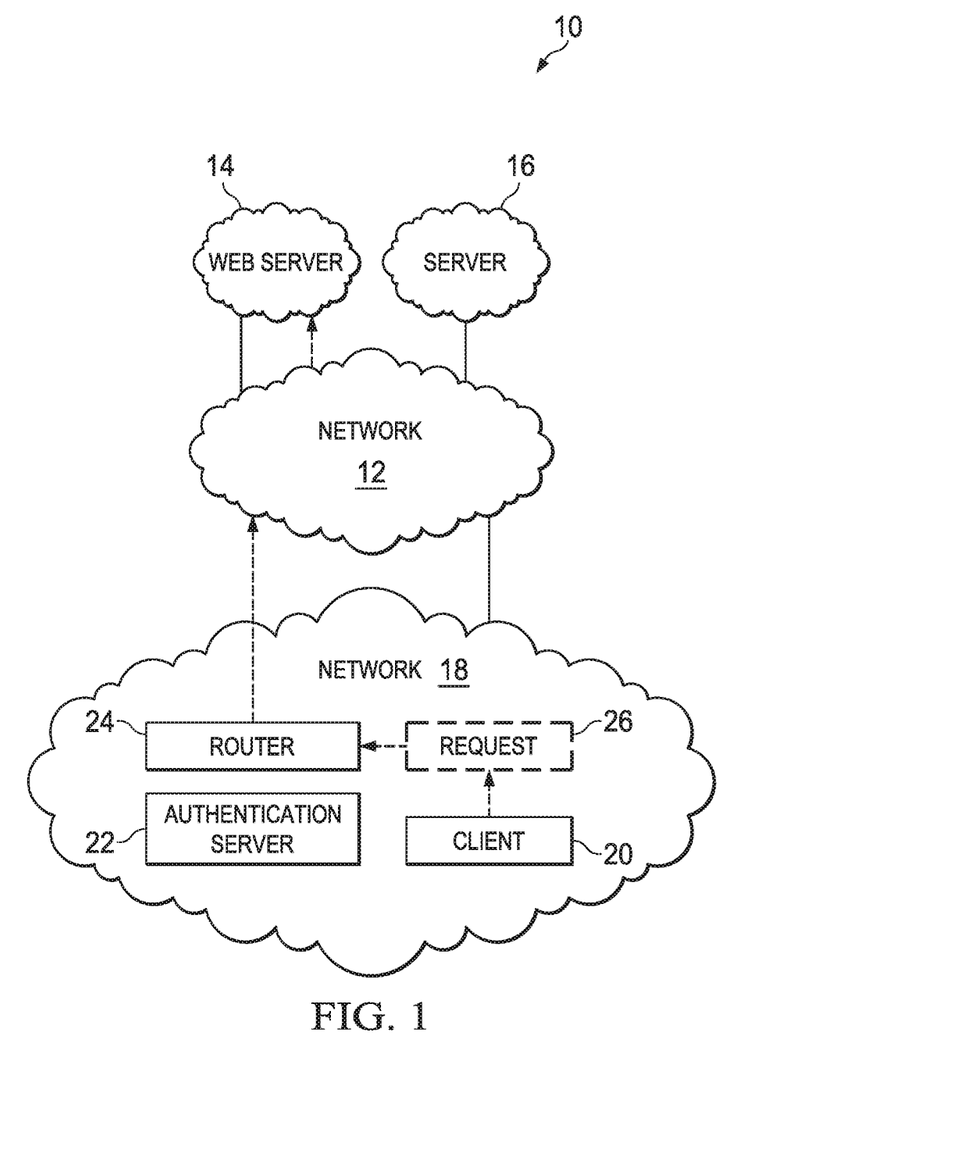
FIG. 1 is a simplified block diagram of a network environment in accordance with an embodiment.

FIG. 1 is a simplified block diagram of a network environment 10 in accordance with an embodiment. Network environment 10 is an environment in which embodiments may be implemented.

Network environment 10 includes a network 12, a Web server 14, a database server 16, and a network 18. Network 12 may be a medium used to provide communications links between various devices and computers connected together within network environment 10. Network 12 may include connections, such as wired communication links, wireless communication links, or both.

In the example, Web server 14 is connected to network 12. Web server 14 is a server configured to send and receive Web pages and Web applications to and from clients that request such data. Similarly, database server 16 is connected to network 12. Database server 16 is a server configured to store and retrieve data in a database that is sent to database server 16 or requested from database server 16. However, in other examples, Web server 14 and database server 16 may run different or additional applications that cause Web server 14 and database server 16 to send and receive different data.

Client 20 is connected to network 18. Client 20 may be, for example, a personal computer or network computer. Client 20 may send data to authentication server 22 and may data messages from authentication server 22 using network 18. Such data may include requests to authenticate a user, verify user credentials, or other suitable examples.

Client 20, authentication server 22, and other devices connected to network 18 may also communicate with Web server 14 and database server 16 using network 12. To communicate with Web server 14 and database server 16, for example, client 20 may send data through network 18 to router 24. Router 24 is a network device connected to both network 18 and network 12. Router 24 may receive the data from network 12, process the data, and transmit the processed data on network 18. Likewise, router 24 may also receive data on network 18, process the data, and transmit the processed data to network 12. One example of such processing is performing network address translation (NAT).

In one example, client 20 is configured to request a Web page from Web server 14. Client 20 is further configured with a network address of router 24 as a gateway to be used by client 20. Client 20 generates request 26 for the Web page using the Hypertext Transfer Protocol (HTTP) and transmits request 26 to router 24. Router 24 receives request 26 and processes request 26. In this example, router 24 first requests information from authentication server 22 to determine whether client 20 is permitted to send request 26 through router 24. When router 24 determines that client 20 is authorized to send request 26 through router 24, router 24 modifies the source address of request 26 to be the address of router 24 on network 12.

Router 24 then transmits request 26 on network 12. Web server 14 on network 12 receives request 26. Web server 14 generates a response to the request and transmits the response to router 24 through network 12. Router 24 processes the response by modifying the destination address, for example, and transmits the response to client 20.

Network environment 10 may include additional servers, clients, and other devices not shown. In the depicted example, Network environment 10 may be a representation of the Internet with network 12 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other network devices that route data and messages. Of course, network environment 10 may also be implemented as a number of different types of networks, such as for example, one or more of an intranet, a local area network (LAN), or a wide area network (WAN). FIG. 1 is intended as an example, and not as an architectural limitation.

Figure 2:
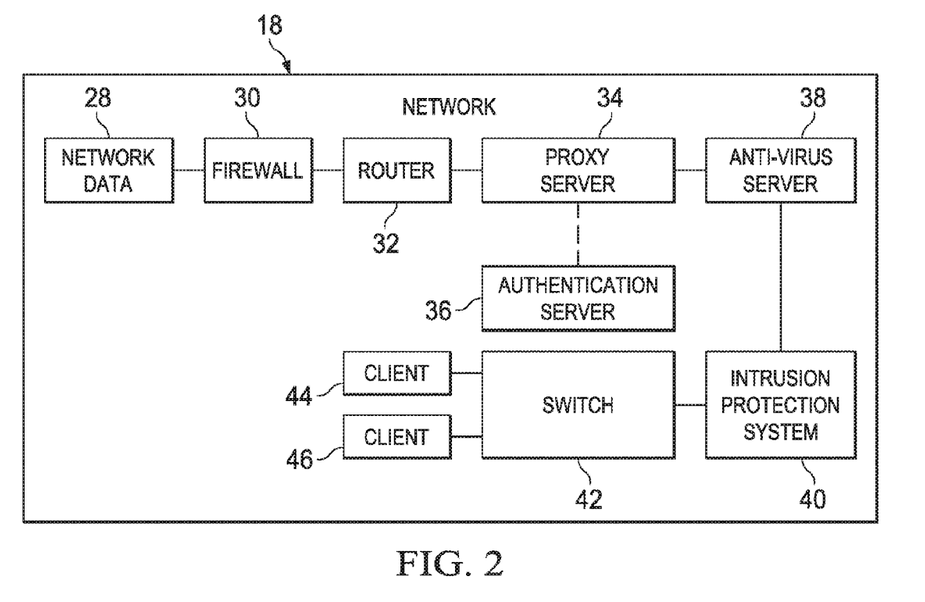
FIG. 2 is a simplified block diagram of a network depicted in accordance with an embodiment.

FIG. 2 is a simplified block diagram of network 18 depicted in accordance with an embodiment. In an embodiment, network 18 includes firewall 30, router 32, proxy server 34, authentication server 36, anti-virus server 38, intrusion protection system 40, switch 42, client 44 and client 46. In this example, network data 28 may be received from another network, such as network 12 in FIG. 1, with a destination of client 44.

In this example, firewall 30 may be configured to receive network data 28. Firewall 30 is a network device configured to allow or deny the transmission of certain network data based on a policy. Firewall 30, using the policy, may be configured to allow network data based on criteria, such as, having certain source and destination addresses, source and destination networks, source and destination ports, content, and other suitable criteria. Likewise, firewall 30 may also be configured to prevent network data from entering network 18 meeting the same, different, and additional types of criteria.

Router 32 may be configured to receive and process (i.e., analyze) network data 28. In this example, router 32 may be configured to modify the destination address and destination port for network data 28 such that the destination address of data 28 is proxy server 34 and the destination port is a port on which proxy server 34 is listening for data 28. Router 32 may be configured to transmit network data 28 to proxy server 34. If network data 28 is coming from proxy server 34, router 32 may be configured to send network data 28 to firewall 30.

In an embodiment, proxy server 34 communicates with router 32, authentication server 36, and anti-virus server 38. Proxy server 34 may be configured to receive network data 28. For example, proxy server 34 may receive network data 28 and identify network data 28 as a response to a request for a Web page from a server outside of network 18. Proxy server 34 may then identify content in the Web page that is not allowed by a policy, such as social networking content. Such a policy may be received, in part, from authentication server 36. For example, a policy may indicate that only certain users of network 18 may be permitted to receive pages with social networking content. In one or more embodiments, network 18 may set such a policy. In this example, the user of client 44 may not be authorized to receive social networking content, so a portion of network data 28 may be removed by proxy server 34 before transmitting network data 28 through network 18 to anti-virus server 38.

Anti-virus server 38 may be configured to communicate with proxy server 34 and instruction protection system 40.

In an embodiment, anti-virus server 38 may be configured to receive network data 28 and determine whether any viruses, malware, or other undesired and malicious software is present in network data 28. When such software is found, anti-virus server 38 may block network data 28 from being transmitted further, anti-virus server 38 may remove certain portions of network data 28, or perform another suitable action. In this example, anti-virus server 38 transmits network data 28 to intrusion protection system 40.

Intrusion protection system 40 may be configured to communicate with anti-virus server 38 and switch 42. Intrusion protection system 40 may be configured to receive data 28 and determine whether the content of network data 28 or circumstances surrounding network data 28 comprise an attack on network 18. For example, intrusion protection system 40 may determine whether network data 28, with a destination of client 44 or being transmitted by client 44, exceeds a predetermined threshold. Exceeding the predetermined threshold may be considered malicious and network data 28 may be blocked from transmission by intrusion protection system 40.

In this example, network data 28 does not comprise an attack on network 18, so intrusion protection system 40 transmits network data 28 to client 44 using network 18. In this example, client 44 is connected to intrusion protection system 40 using switch 42. Switch 42 receives network data 28 and retransmits network data 28 to client 44. Client 44 receives data 28 and displays a Web page using the contents of network data 28.

Each of the network devices of network 18 may be configured to perform complex processing, such as, deep packet inspection, protocol analysis, state-machine on network data 28, per packet basis looking for malicious content. As part of the processing every network device spends processor cycles gathering critical information regarding network data 28. In currently existing mechanisms, as network data 28 is forwarded to the next network device in the chain for processing, that network device must perform all of the processing on network data 28 over again. If the network devices are implemented as virtual machine within a virtual environment, this redundant processing will use more cycles gathering information limiting processing capability and scalability. Additionally, security elements and core business logic have no insight into the security attributes or the processing done on network data 28 by the other network devices in the chain for any given network data. Also, network devices may tap into a cloud for real-time information regarding network data 28. Retrieving data from a cloud may be computationally expensive if done by each network device in the chain to obtain same information. However, there currently exists no mechanism to leverage and build on the processing done by the previous entity in the chain for security and network data processing.

The different examples provide a number of advantages. For example, the different embodiments allow for a network device in a network to use the result of processing performed by a previous network device through which network data 28 has already traveled. The use of processing by the previous network device allows the network device to process the data without having to repeat actions already performed by the previous network device.

In one or more embodiments, network devices in the network infrastructure do processing, including deep packet inspection, protocol analysis, and state-machine processing, looking for malicious content. As part of the processing, each network device uses resources gathering information regarding network data 28. As network data 28 is forwarded to the next network device in the route for processing, the next network device may analyze a metadata tag added by the previous network device to perform additional processing. The metadata tag may be information and data about network data 28. By receiving the metadata tag about network content 28, a network device may avoid reprocessing network data in the same way multiple times. The metadata tag may be shared across network devices within a network. The metadata tag may be transmitted to and from the different entities using in-band or out-of-band channels. Additionally, the metadata tag may be shared across logical and physical connections, tunnels, through any protocol to protocol translates, etc.

One or more embodiments may provide that a network device adds a metadata tag, which includes metadata information and fields. The metadata tag may be added to network data when the network data first enters a network, domain, Active Directory domain, or other group of network devices. In other embodiments, any device within the group of network devices may add the metadata tag. Further, the last network device to receive the network data prior to sending the data outside of the group of network devices may remove the metadata tag. In other embodiments, any network device may remove the metadata tag. Thus, the metadata tag may be removed before it reaches undesired network devices.

The embodiments provide that each network device, after processing the network data, may attach critical information to the traffic stream in the form of a metadata tag. This metadata tag may be used to present any data related to the processing of this network data to the next network device or network devices that is between the end-points. The embodiments build synergy across various network devices within a domain by leveraging upon the information assembled by one network device to be presented to the next network device in the chain for the same network data. The embodiments herein help reduce redundant processing of network data by various elements increasing efficiency as well provide better protection with scaling. This metadata tag could be implemented across various network devices such as, for example, an intrusion protection system, a data loss prevention system, a firewall, a load balancer, end points, and servers.

Creating synergy helps leverage the processing done by various elements leading to efficient processing and scalability. The embodiments herein enable different network devices to operate like one distributed system trying to solve different piece of the same puzzle. The embodiments herein may also operate when applied to virtual environments where each of the network devices are instantiated as virtual machines. Every network device can leverage on the metadata tag by building an ecosystem and taking security to a next level. Also when the network devices need to plug into a cloud for real-time data, which is very expensive operation in terms of processing, the different embodiments herein may increase efficiency. Since the metadata tag itself may be encrypted by a key, this provides additional protection for the metadata tag itself.

Figure 3:
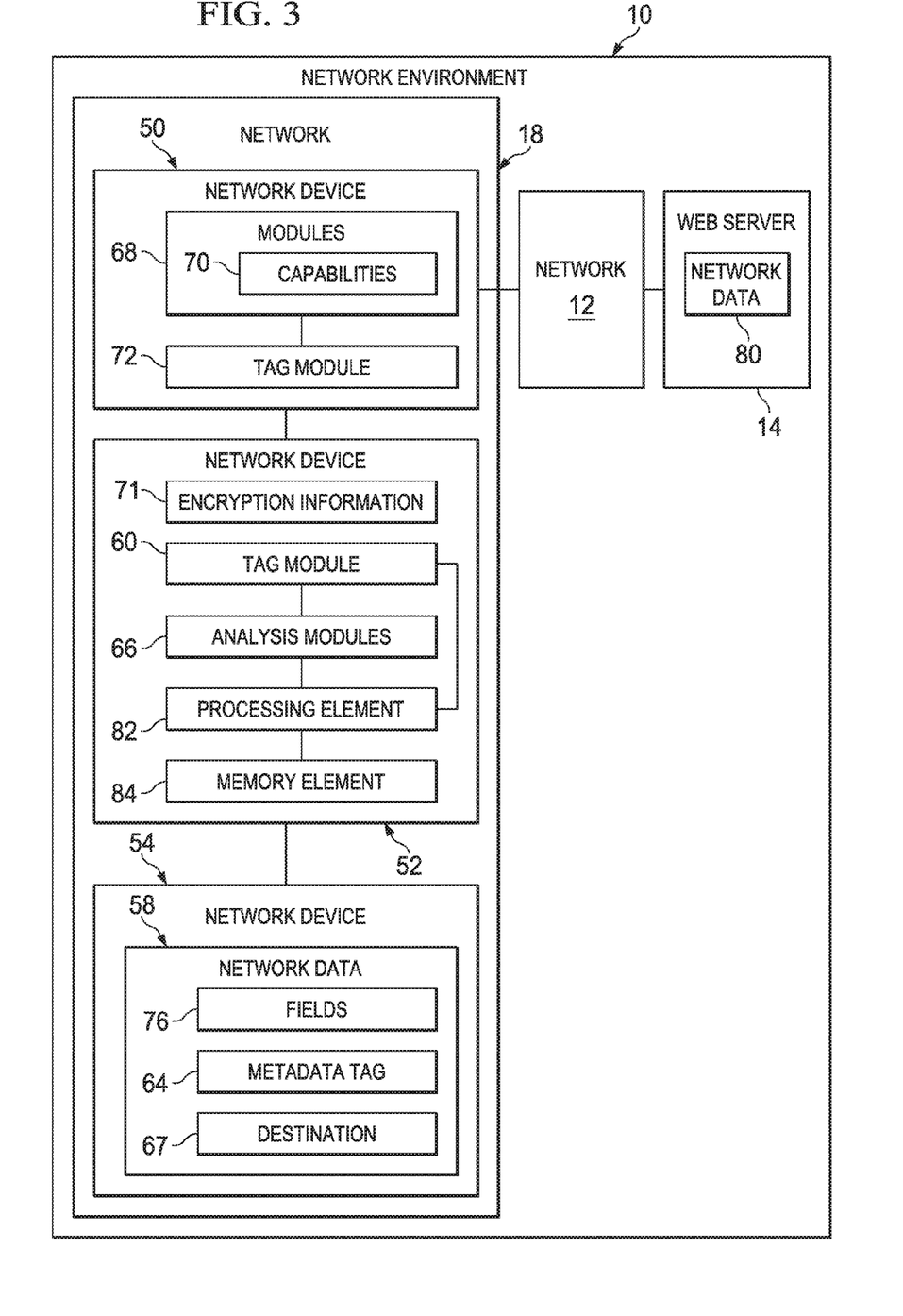
FIG. 3 is a simplified block diagram of a network environment depicted in accordance with an embodiment.

FIG. 3 is a simplified block diagram of a network environment 10 depicted in accordance with an embodiment. In an embodiment, network environment 10 includes network 18, network device 50, network device 52, network device 54, Web server 14, and network 12. Network device 50, network device 52, and network device 54 are connected within network 18. Network 18 may be connected to network 12 through network device 50. In some examples, network 12 may be a representation of the Internet. Additionally, in other examples, network 12 may be a representation of a private network. Web server 14 is connected to network 12. In other examples, web server 14 may be another type of network.

In this example, network device 52 and network device 54 may communicate with one another using network 18, but network device 52 and network device 54 may only communicate with Web server 14 by sending and receiving data through network device 50. Network device 50 may be a router in some examples. For example, network device 50 may be router 32 in FIG. 2. Further, network device 52 may be an example implementation of anti-virus server 38 in FIG. 2. In other examples, network devices 50-54 may be other types of network devices.

In one example, network device 54 generates network data 58 and sends network data 58 to network device 52. Network data 58 may be number of data packets of network data traffic. A data packet, as used herein, is a unit of data configured for travelling through a network. Each data packet may have a number of portions. In an example, a packet has two portions, a body and a number of headers. In another example, network data 58 may be a hypertext transfer protocol (HTTP) request.

Network device 54 is configured to send network data 58 intended for Web server 14 to network device 52. Accordingly, network device 52 may be configured as a gateway for network device 54.

Figure 4:
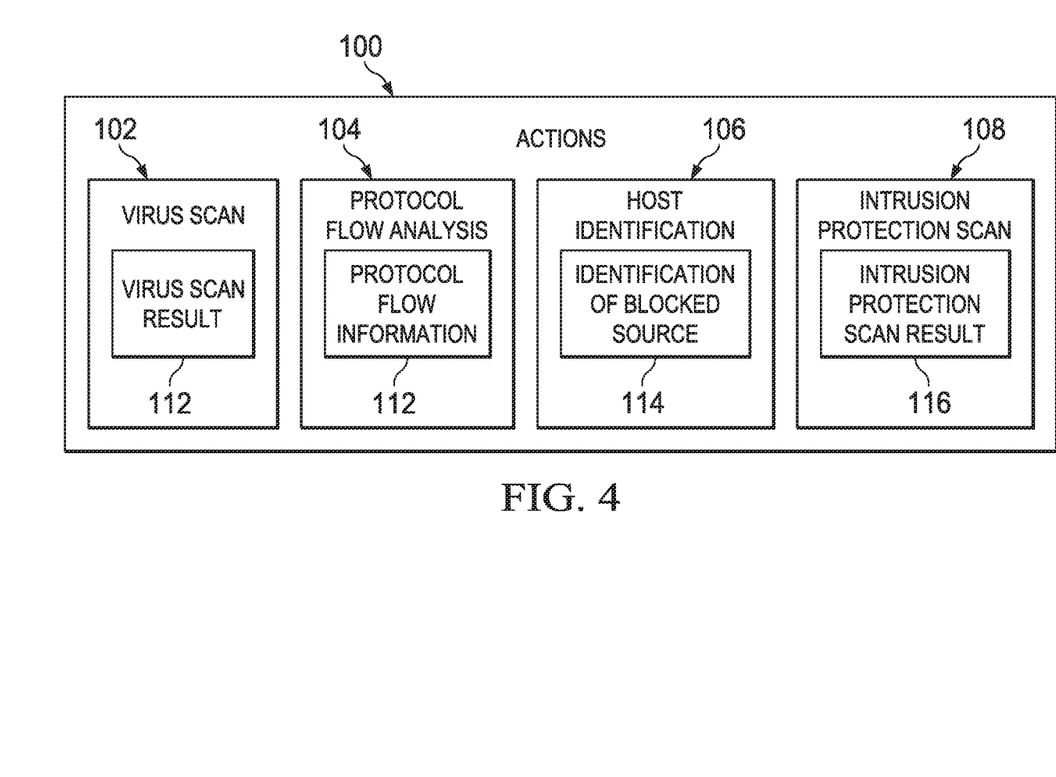
FIG. 4 a simplified block diagram of actions performed by modules of a network device in accordance with an embodiment.

Network device 52 may perform processing on network data 58. Network device 52 may include tag module 60 and analysis modules 66. Network device 52 may be configured to notify tag module 60 that network data has been received. Tag module 60 may be configured to determine whether network data 58 includes metadata tag 64. Metadata tag 64 may be a collection of network information related to network data 58 and processing of network data 58 by network device 54 and other previous network devices for which network data 58 has passed through. For example, the information may include a virus scan result, protocol flow information, identification of a blocked source address, an intrusion protection scan result, and other suitable data. Examples of the network information are depicted in FIG. 4.

Analysis modules 66 and tag module 60 may work together to exchange network information. For example, analysis modules 66 may perform actions on network data 58 and send the results of the actions to tag module 60. Likewise, tag module 60 may identify network information in a metadata 64 tag associated with network data 58 and send the network information to analysis module 66. Analysis modules 66 may be representative of different components of network device 52. For example, analysis modules 66 may be a security module or other processing module of network device 52. In even further embodiments, analysis modules 66 may be a representation of a combination of modules used by network device 52, such as, for example, any of the network devices depicted in FIG. 2.

Analysis modules 66 may be configured to perform a number of actions on network data 58. The actions may be, for example, a virus scan, a protocol flow analysis, host identification, and other suitable actions. A number of examples of the actions are depicted in FIG. 4. If network data 58 included metadata tag 64, analysis modules 66 may perform the number of actions based on network information in metadata tag 64. The result of the actions may produce an analysis that includes network information. The actions may be performed fully, partially, entirely skipped, or redone.

Analysis modules 66 may also retrieve and use prior analysis on similar type of data to network data 58 within a predetermined period of time. For example, analysis modules 66 may use the network information provided by tag module 60, combined with prior analysis information provided by network device 52, analysis modules 66, a cloud service, or another type of analysis engine. The combination of the prior analysis with the network information in metadata tag 64 may allow analysis modules 66 to reduce the number of actions normally performed on network data 58. In other embodiments, the combined information may result in analysis modules 66 performing more actions or the same actions normally performed.

For example, in an example in which the network information is an identification of network data 58 being the same or similar to other network data processed by tag module 60 within a predetermined period of time, analysis modules 66 may determine not to perform a virus scan. In another example, analysis modules 66 may respond to tag module 60 with an indication that a virus scan and a protocol flow analysis are to be performed by analysis modules 66. Tag module 60 may add or update fields 76 to metadata tag 64 to form metadata tag 64. Fields 76 may separate the different types of analysis performed on network data 58.

Additionally, tag module 60 may be configured to determine whether a destination 67 for network data 58 is within set of destinations. Destination 67 may be the address of the network device to which network data 58 is addressed. In this example, destination 67 for network data 58 is network device 52. The set of destinations may be a number of network devices belonging to an Active Directory domain, a subnet, a workgroup, or another suitable number of network devices. In one example the set of destinations is network 18.

If destination 67 is within the set of destinations, tag module 60 may be configured to generate metadata tag 58 if metadata tag 64 is not already associated with network data 58. Additionally, tag module 60 may be configured to encrypt and decrypt metadata tag 64. Tag module 60 may include encryption information 71. Encryption information 71 may be used by network device 52 to encrypt metadata tag 58. In an example, network device 52 may be configured to generate metadata tag 64 using an encryption key, cipher suite algorithm, valid key time duration, and version.

Network device 52 may first identify the cipher suite algorithm to use in encrypting metadata tag 64. The cipher suite algorithm may include, for example, Advanced Encryption Standard (AES), Rivest Cipher 4 (RC4), Data Encryption Standard (DES), or another suitable algorithm. Network device 52 may then encrypt metadata tag 64 using the encryption key and version of the cipher suite algorithm. In some examples, network device 52 also uses an identifier to encrypt metadata tag 64. The identifier may be a set of numbers and characters that represent metadata tag 64. The identifier may be generated using a hashing algorithm, such as Message Digest 5 (MD5), Secure Hash Algorithm (SHA), or another suitable algorithm. In one example, the identifier is a hash of metadata tag 64.

Additionally, tag module 60 may identify a number of modules 68 that are within the set of destinations and are to receive network data 58. Module 68 may be identified using routing information. Once modules 68 are identified, tag module 60 may identify a number of capabilities 70 for each of modules 68 and add only network information to metadata tag 64 that would be used by modules 68. For example, network device 52 may be an anti-virus server and network device 50 may be a router. In such an example, tag module 60 would add network information to metadata tag 64 that would be used by the router of network device 50, such as protocol flow information, and not information for an intrusion prevention system.

Tag module 60 may be configured to associate metadata tag 64 to network data 58 when there is not a metadata tag already associated with network data 58. In an example, tag module 60 may associate headers containing metadata tag 64 with network data 58. The headers may be sent before or after contents of network data 58. For example, if network data 58 is an HTTP request, the headers may be the set of key value pairs at the beginning of the HTTP request prior to the body of the HTTP request. Additionally, in other examples tag module 60 adds metadata tag 64 directly to the content of network data 58. In further examples, metadata tag 64 may be included anywhere in network data 58 starting from L2 and L3 to the application data.

Network device 52 may be configured to send network data 58 to network device 50. Network device 50 may be configured to receive network data 58. Additionally, network device 50 may include tag module 72. Tag module 72 may be at least similar to tag module 60.

Network device 50 may be configured to receive network data 58 and notify tag module 72 of the reception. Tag module 72 may also process network data 58 by identifying whether destination 67 is within the set of destinations. Destination 67 is the next network device that is to receive network data 58. In this example, destination 67 is Web server 14. Web server 14 is not within network 18 and not in the set of destinations. Tag module 72 may be configured to remove metadata tag 64 in response to destination 67 not being within the set of destinations.

In another example, assume destination 67 is in the set of destinations and network data 58 is to be sent to destination 67 by network device 50. In such an example, network device 50 may be configured to perform processing on network information 58 and update metadata tag 64 before sending metadata tag 64 to the next network device.

Web server 14 may also send network data 80 to network device 54. In such an example, Web server 14 sends network data 80 first to network device 50. Tag module 72 may be configured to determine that network device 52 (the next network device in the chain) is in the set of destinations. In such an example, modules 68 may perform one or more actions on network data 80. Tag module 72 may generate and associate a metadata tag to network data 80, and send network data 80 to network device 52. Network device 52 is the next hop for network data 80 between network device 50 and network device 54. Analysis module 66 and tag module 60 likewise process network data 80 and the metadata tag. Network device 52 then sends network data 80 to network device 54.

Note that in certain example implementations, the metadata tag activities outlined herein may be implemented by logic encoded in one or more tangible media, which may include non transitory media. For example, the activities outlined herein may be implemented by embedded logic provided in an application specific integrated circuit (ASIC), digital signal processor (DSP) instructions, software (potentially inclusive of object code and source code), firmware, and/or hardware to be executed by a processing element 82, or other similar machine, etc. In some of these instances, a memory element 84 can store data used for the operations described herein. This includes memory element 84 being able to store software, logic, code, or processor instructions that are executed to carry out the activities described in this Specification.

Processing element 82 can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by processing element 82) and the elements identified herein could be some type of a programmable processor, programmable digital logic (e.g., a field programmable gate array (FPGA), an erasable programmable read only memory (EPROM), an electrically erasable programmable ROM (EPROM)) or an ASIC that includes digital logic, software, code, electronic instructions, or any suitable combination thereof. Any of the potential processing elements, modules, and machines described in this Specification should be construed as being encompassed within the broad term 'processing element.'

The computer elements in network environment 10 may further keep information, to be used in achieving the metadata tag activities as discussed herein, in any suitable memory element (e.g., random access memory (RAM), read only memory (ROM), PROM, EPROM, ASIC, a disk drive, a floppy disk, a compact disk ROM (CD-ROM), a digital versatile disk (DVD), flash memory, a magneto-optical disk, other types of nonvolatile machine-readable media that are capable of storing data and information, etc.), software, hardware, firmware, or in any other suitable component, device, element, or object where appropriate and based on particular needs. Moreover, the information being used, tracked, sent, or received in network system 10 could be provided in any database, register, queue, table, cache, or other storage structure, all of which can be provided in any suitable timeframe. Any of the memory items or storage options may be included within the broad term 'memory element' as used herein.

It is recognized that the tag module and analysis modules may have additional and different processes than the processes listed herein. Additionally, different blocks may be separated from other blocks or combined with other blocks. For example, analysis module 66 may be outside of network device 52 and within a cloud or another network device.

The embodiments herein leverage upon the processing done by the previous network devices in the chain. For example, the first network device in the chain may gather important piece of information regarding this network data tracked by means of a state. This network device can share some of the important network information gathered from the network data that the next network device is interested in. This may include critical redundant data gathered but needed across network devices, such as, for example, flow state, flow connection info, traffic load at that instant, disk operating system attack info, compliance, secure socket layer or virtual private network tunnel info, application detection, proxy information, global threat intelligence reputation info etc. The network information may also include a result of security inspection report by an entity, other information customized & specific to a domain. Further, the network information may be extended to present non-security info.

In operation terminology, a specific example with regard to hypertext transfer protocol (HTTP) may illustrate how the metadata tag can be presented to the next network device by embedding the metadata tag to any part of the network data as appropriate. For example, for HTTP, the metadata tag can be attached as illustrated below:

HTTP Get request metadata tag data sample
GET /cmd.exe HTTP/1.1
User-Agent: curl/7.18 (i386-redhat-linux-gnu
Host: 23.12.123.61
X-Security-Inspection-Tag: ip-reputation=suspicious; appId=http Additionally, the metadata tag may be encrypted by a key so that no unauthorized or rogue device can tamper with this data. The key for encryption may be generated periodically.

In an embodiment, each network device may set up a secure trusted channel with the metadata tag key server using secure socket layer (SSL) protocol. The metadata tag key server provides the following information to all network devices over a secure SSL channel:
1. Key <64-128 bit key>
2. Cipher Suite Algorithm <RC4, DES-CBC, etc>
3. Valid key time duration <3600 sec>
4. Version <1.0>

The first entity inserts the metadata tag as well encrypts the metadata tag using the key and algorithm specified by the key server. The next network device in the chain first decrypts the data with the same key and algorithm, updates the info and then re-encrypts the metadata tag with the same key provided by the metadata tag key server.

FIG. 4 a simplified block diagram of actions performed by modules of a network device in accordance with an embodiment. In an embodiment, actions 100 are a group of one or more actions that may be performed by network device 50, network device 52, network device 54 and other suitable systems. In this example, actions 100 includes a virus scan 102, a protocol flow analysis 104, a host identification 106, and an intrusion protection scan 108.

Virus scan 102 is a determination of whether the network data being transmitted across a network, such as network 18 in FIG. 3, includes at least a portion of a virus, malware, or other malicious software. Virus scan 102 generates a virus scan result 110. Virus scan result 110 may include whether the network data includes a virus, identification information for what virus or viruses are contained in the data, an indication that the network data does not contain any known viruses, an identification of the network device that performed the virus scan, the version number of virus scan software used, and other suitable information.

Protocol flow analysis 104 is an identification of characteristics about the flow of network data being sent and received by a network device. For example, a protocol flow analysis may include a window size for a sliding window in the transmission control protocol (TCP). Protocol flow analysis 104 causes protocol flow information 112 to be generated. Protocol flow information 112 may include, for example, a receive window size, an indication of the rate at which network data is being received and sent, an indication of whether flow control is enabled and with which parameters, and other suitable information.

Host identification 106 is an identification of the network devices involved in the network data transfer using the network. Host identification 106 may include any of the source network device, the destination network device, and any host through which the network data has traveled between source and destination. In some examples, host identification 106 generates identification of blocked source address 114. In such an example, a proxy server, such as proxy server 34 in FIG. 2, may identify that the destination for the network data is not permitted with the given authentication for the requestor. Thus, the proxy server may generate identification of blocked source address 114 before transmitting the network data. In an example, the proxy server may transmit the network data to a logging server for further processing.

Intrusion protection scan 108 is an identification of whether the contents of the network data and circumstances surrounding the network data comply with a policy for network data use generated by the entity controlling the network. For example, intrusion protection scan 108 may identify network data from a network device on the network containing usernames and passwords. Such data may have a destination outside the network. Thus, intrusion protection scan 108 may generate intrusion protection scan result 116. In an example in which the network data contains no data that violates the policy for intrusion protection scan 408, intrusion protection scan result 116 may contain an identification that no such data is present in the network data, an identification of the network device that performed the intrusion protection scan, an identification of version information for the intrusion protection scan and the intrusion data used to perform the scan, and other suitable information.

The actions depicted in FIG. 4 are only an example of the possible actions taken by a network device in these examples, and other actions are possible. For example, actions 100 may include other security inspections, actions specified by the entity controlling the network, retransmitting the network data to another destination, and other suitable actions. Likewise, virus scan result 110, protocol flow information 112, identification of blocked source address 114, and intrusion protection scan result 116 are only examples of the network information that may be included in the metadata tag associated with the network data. For example, the network information may include flow state, flow connection info, traffic load at a particular moment in time, denial of service attack information, application detection, compliance with particular policies, secure socket layer (SSL) or virtual private network (VPN) information, proxy information, Global Threat Intelligence (GTI) reputation information, or other suitable information.

Figure 5:
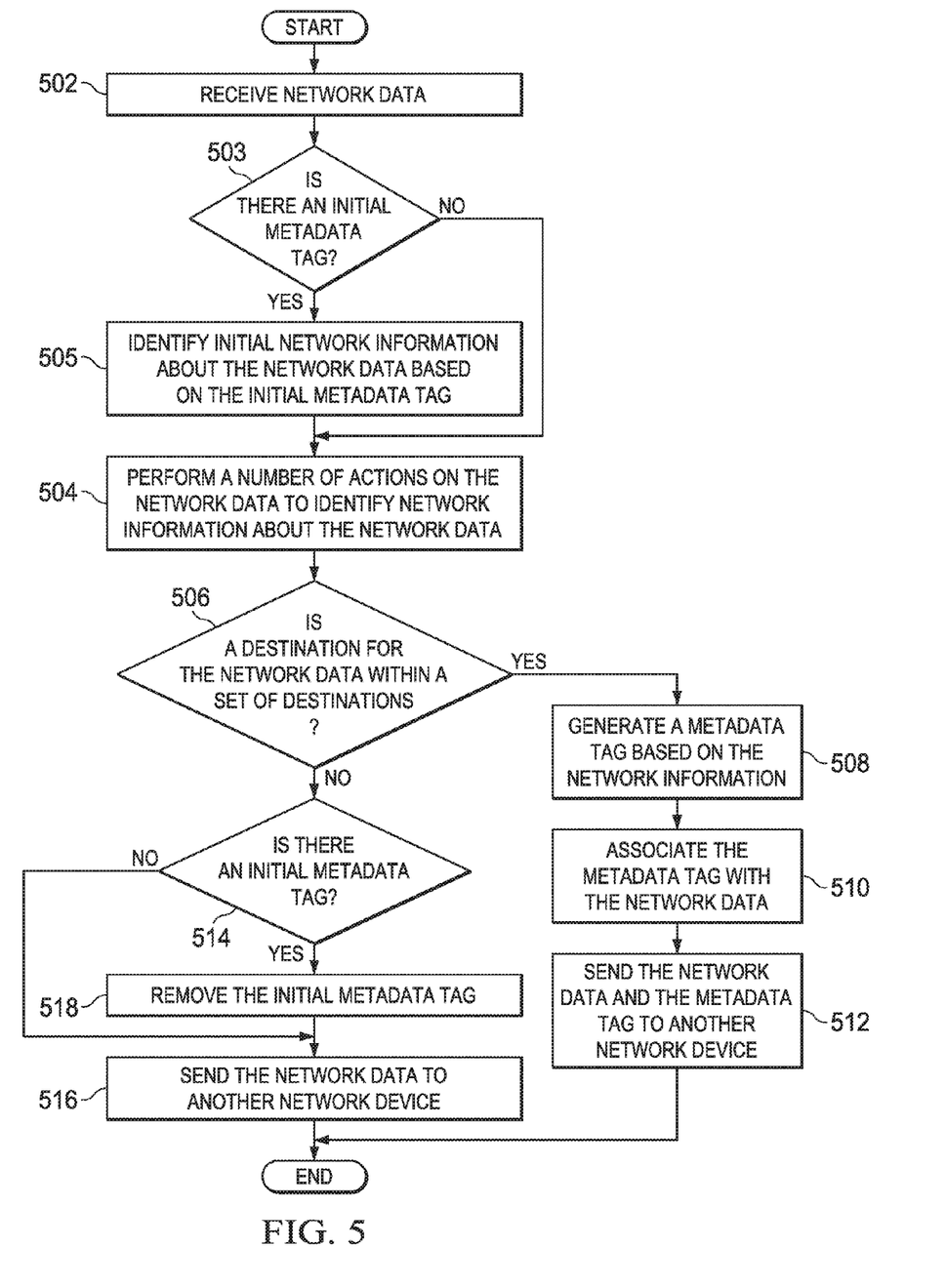
FIG. 5 is a flowchart illustrating an example flow that may be associated with network system for managing network data in accordance with an embodiment.

FIG. 5 is a flowchart illustrating an example flow 500 that may be associated with network system 10 for managing network data in accordance with an embodiment. In an embodiment, flow 500 represents one or more activities performed by an analysis module and tag module.

In an embodiment, flow 500 may begin at 502, where a network device may receive network data. At 503, the tag module may determine whether there is an initial metadata tag associated with the network data.

If there is not an initial metadata tag, at 504, the analysis module may perform a number of actions on the network data to identify network information about the network data. If there is an initial metadata tag, at 505, the tag module may identify initial network information about the network data based on the initial metadata tag. Flow 500 may move from 505 to 504. In this example, at 504, the analysis module may perform the number of actions on the network data to identify network information about the network data using the initial network data.

At 506, the tag module may determine whether a destination for the network data is within a set of destinations. If the destination is within the set of destinations, at 508, the tag module may generate a metadata tag based on the network information. If there already existed an initial metadata tag, the tag module may generate more fields to add to the initial metadata tag.

At 510, the tag module may associate the metadata tag with the network data. If there was already an initial metadata tag, the tag module may associate the extra fields to the initial metadata tag. At 512, the network device may send the network data and the metadata tag to another network device.

At 506, if the destination for the network data is not within the set of destinations, at 514, the tag module determines if there was an initial metadata tag. If there was not an initial metadata tag, at 516, the network device sends the network data to another network device. If there was an initial metadata tag, at 518, the tag module removes the initial metadata tag. After 518, flow 500 moves to 516 and the network device sends the network data to the other network device. After 512 and 516, the process terminates or repeats.

Figure 6:
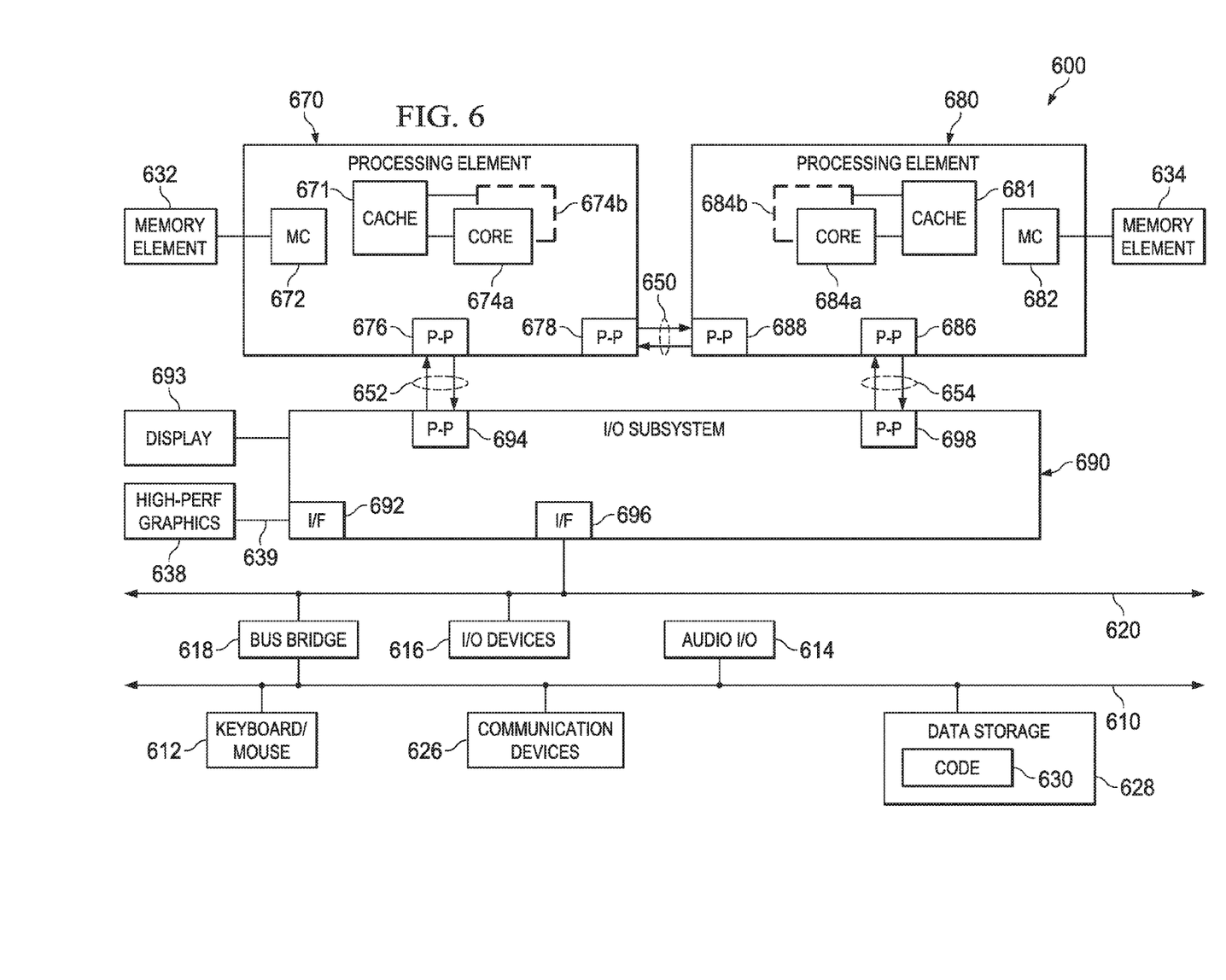
FIG. 6 is a simplified block diagram illustrating a computing system that is arranged in a point-to-point configuration according to an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, computer elements of network system 10 may be configured in the same or similar manner as computing system 600.

In one embodiment, the computing system 600 includes, but is not limited to, a desktop computer, a laptop computer, a netbook, a tablet, a notebook computer, a personal digital assistant (PDA), a server, a workstation, a cellular telephone, a mobile device, a smart phone, an Internet appliance or any other type of computing device. In another embodiment, computing system 600 implements the methods disclosed herein and may be a system on a chip (SOC) system.

As illustrated in FIG. 6, system 600 may include several processing elements, of which only two processing elements 670 and 680 are shown for clarity. While only two processing elements 670 and 680 are shown, it is to be understood that an embodiment of system 600 may also include only one such processing element. Processing elements 670 and 680 may each include a processor core 674a and 684a to execute multiple threads of a program. Processors 670 and 680 may also each include integrated memory controller logic (MC) 672 and 682 to communicate with memory elements 632 and 634. The memory elements 632 and 634 may store various data. In alternative embodiments, memory controller logic 672 and 682 may be discrete logic separate from processing elements 670 and 680.

Processing elements 670 and 680 may be any type of a processing element (also referred to herein as 'processor'). Processing elements 670 and 680 may exchange data via a point-to-point (PtP) interface 650 using point-to-point interface circuits 678 and 688, respectively. Processing elements 670 and 680 may each exchange data with an I/O subsystem 690 via individual point-to-point interfaces 622 and 624 using point-to-point interface circuits 676, 686, 694, and 698. As shown herein, I/O subsystem is separated from processing elements 670 and 680. However, in an embodiment, I/O subsystem is integrated on the same chip as processing elements 670 and 680. Also, I/O subsystem may be partitioned differently with fewer or more integrated circuits. Additionally, I/O subsystem 690 may also exchange data with a high-performance graphics circuit 638 via a high-performance graphics interface 639, using an interface circuit 692, which could be a PtP interface circuit. In an embodiment, I/O subsystem 690 may connect to a display 693 through an interface circuit. Display 693 may include, but is not limited to, a liquid crystal display (LCD), a plasma, cathode ray tube (CRT) display, a touch screen, or any other form of visual display device. In alternative embodiments, any or all of the PtP links illustrated in FIG. 6 could be implemented as a multi-drop bus rather than a PtP link.

As shown in FIG. 6, each of processing elements 670 and 680 may be multicore processors, including first and second processor cores (i.e., processor cores 674a and 674b and processor cores 684a and 684b). Such cores may be configured to execute instruction code in a manner similar to that discussed above with reference to FIGS. 1-5. Each processing element 670, 680 may include at least one shared cache 696. Shared cache 671, 681 may store data (e.g., instructions) that are utilized by one or more components of processing elements 670, 680, such as cores 674a, 674b, 684a, and 684b. Processing elements 670 and 680 may be examples of processing element 84 as shown in FIG. 3. Additionally, memory elements 632 and 634 may be examples of memory element 84 as shown in FIG. 3.

I/O subsystem 690 may be in communication with a bus 620 via an interface circuit 696. Bus 616 may have one or more devices that communicate over it, such as a bus bridge 618 and I/O devices 616. Via a bus 610, bus bridge 618 may be in communication with other devices such as a keyboard/mouse 612 (or other input device such as a touch screen, trackball, etc.), communication devices 626 (such as modems, network interface devices, or other types of communication devices that may communicate through a computer network), audio I/O devices 614, and a data storage device 628. Data storage device 628 may store code 630 that may be executed by processing elements 670 and 680. In alternative embodiments, any portions of the bus architectures could be implemented with one or more PtP links.

The computing systems depicted herein are schematic illustrations of embodiments of computing systems, such as a host computer, that may be utilized to implement various embodiments discussed herein. It will be appreciated that various components of the systems depicted herein may be combined in a system-on-a-chip (SoC) architecture or in any other suitable configuration. For example, embodiments disclosed herein can be incorporated into systems such as, for example, mobile devices such as smart cellular telephones, tablet computers, personal digital assistants, portable gaming devices, etc. It will be appreciated that these mobile devices may be provided with SoC architectures in at least some embodiments.

In one example implementation, computer elements of network system 10 may include software in order to achieve the metadata tag activities outlined herein. These activities can be facilitated by various modules (e.g., a tag module, analysis module, etc.), which can be suitably combined in any appropriate manner, and which may be based on particular configuration and provisioning needs. In other embodiments, these metadata tag activities may be executed externally to these elements, or included in some other computer element to achieve this intended functionality. In still other embodiments, the elements in network system 10 may include this software (or reciprocating software) that can coordinate with other computer elements in order to achieve the operations, as outlined herein. Furthermore, the modules can be implemented as software, hardware, firmware, or any suitable combination thereof.

Note that with the examples provided herein, interaction may be described in terms of two, three, or more computer elements. However, this has been done for purposes of clarity and example only. In certain cases, it may be easier to describe one or more of the functionalities of a given set of flows by only referencing a limited number of computer elements. It should be appreciated that network system 10 and its teachings are readily scalable and can accommodate a large number of components, as well as more complicated/sophisticated arrangements and configurations. Accordingly, the examples provided should not limit the scope or inhibit the broad teachings of network system 10 as potentially applied to a myriad of other architectures.

It is also important to note that the processes in the preceding flow diagrams illustrate only some of the possible network security tag creation and management scenarios and patterns that may be executed by, or within, network system 10. Some of these processes may be deleted or removed where appropriate, or these processes may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations.

EXAMPLES

Example 1 is an apparatus for managing network data, comprising: a network device; an analysis module coupled to the network device, wherein the analysis module is configured to perform a number of actions on the network data to identify network information about the network data; and a tag module coupled to the network device and analysis module, wherein the tag module is configured to determine whether a destination for the network data is within a set of destinations; and responsive to a determination that the destination for the network data is within the set of destinations: generate the metadata tag based on the network information; associate the metadata tag with the network data; and transmit the network data with the metadata tag.

Additionally, the subject matter of Example 1 can optionally include, the apparatus further comprising: a processing element, wherein the processing element is coupled to the network device; and a memory element, wherein the memory element is coupled to the processing element.

In example 2, the subject matter of Example 1 can optionally include, the network device is further configured to: receive the network data with an initial metadata tag; and identify initial network information from initial metadata tag.

In example 3, the subject matter of any one of Examples 1-2 can optionally include, the analysis module is further configured to: perform the number of actions on the network data based on the initial network information to identify the network information.

In example 4, the subject matter of any one of Examples 1-3 can optionally include, the tag module is further configured to: generate a number of fields associated with the network data; and add the network information to the number of fields to form the metadata tag.

In example 5, the subject matter of any one of Examples 1-4 can optionally include, the tag module is further configured to: responsive to a determination that the destination for the network data is not within the set of destinations, remove the initial metadata tag; and wherein the network device is further configured to: transmit the network data.

In example 6, the subject matter of any one of Examples 1-5 can optionally include, the tag module is further configured to: determine whether the initial metadata tag is encrypted; responsive to a determination that the initial metadata tag is encrypted, decrypt the initial metadata tag; and encrypt the metadata tag prior to transmitting the network data and the metadata tag.

In example 7, the subject matter of any one of Examples 1-6 can optionally include, the tag module is further configured to: generate an identifier for the network data; and encrypt the metadata tag using an encryption key and the identifier for the network data.

In example 8, the subject matter of any one of Examples 1-7 can optionally include, the number of actions is selected from a group consisting of: a) a virus scan; b) a protocol flow analysis; c) a host identification; d) sharing private data; and e) an intrusion protection scan.

In example 9, the subject matter of any one of Examples 1-8 can optionally include, the network information is selected from a group consisting of: a) at least one of a protocol flow information; b) a security risk analysis; c) an identification of a blocked source address; d) an antivirus scan result; and e) an intrusion protection scan result.

Example 10 is at least one computer readable storage medium that includes code for execution for managing an application, and when executed by a processing element is operable to: receive the network data; perform a number of actions on the network data to identify network information about the network data; determine whether a destination for the network data is within a set of destinations; and responsive to a determination that the destination for the network data is within the set of destinations: generate a metadata tag based on the network information; associate the metadata tag with the network data; and transmit the network data with the metadata tag.

In example 11, the subject matter of Examples 10 can optionally include, the code to receive the network data includes further code for execution and when executed by the processing element is operable to: receive the network data with an initial metadata tag; and identify initial network information from initial metadata tag.

In example 12, the subject matter of any one of Examples 10-11 can optionally include, the code to perform the number of actions on the network data includes further code for execution and when executed by the processing element is operable to: perform the number of actions on the network data based on the initial network information to identify the network information.

In example 13, the subject matter of any one of Examples 10-12 can optionally include, the code to generate the metadata tag includes further code for execution and when executed by the processing element is operable to: generate a number of fields associated with the network data; and add the network information to the number of fields to form the metadata tag.

In example 14, the subject matter of any one of Examples 10-13 can optionally include, the code includes further code for execution and when executed by the processing element is operable to: responsive to a determination that the destination for the network data is not within the set of destinations, remove the initial metadata tag; and transmit the network data.

In example 15, the subject matter of any one of Examples 10-14 can optionally include, the code includes further code for execution and when executed by the processing element is operable to: determine whether the initial metadata tag is encrypted; responsive to a determination that the initial metadata tag is encrypted, decrypt the initial metadata tag; and encrypt the metadata tag prior to transmitting the network data and the metadata tag.

In example 16, the subject matter of any one of Examples 10-15 can optionally include, the code includes further code for execution and when executed by the processing element is operable to: generate an identifier for the network data; and encrypt the metadata tag using an encryption key and the identifier for the network data.

In example 17, the subject matter of any one of Examples 10-16 can optionally include, the number of actions is selected from a group consisting of: a) a virus scan; b) a protocol flow analysis; c) a host identification; d) sharing private data; and e) an intrusion protection scan.

In example 18, the subject matter of any one of Examples 10-17 can optionally include, the network information is selected from a group consisting of: a) at least one of a protocol flow information; b) a security risk analysis; c) an identification of a blocked source address; d) an antivirus scan result; and e) an intrusion protection scan result.

Example 19 is a method for managing network data, comprising: receiving the network data; performing a number of actions on the network data to identify network information about the network data; determining whether a destination for the network data is within a set of destinations; and responsive to a determination that the destination for the network data is within the set of destinations: generating a metadata tag based on the network information; associating the metadata tag with the network data; and transmitting the network data with the metadata tag.

In example 20, the subject matter of Example 19 can optionally include, the receiving the network data comprises: receiving the network data with an initial metadata tag; and identifying initial network information from initial metadata tag.

In example 21, the subject matter of any one of Examples 19-20 can optionally include, the performing the number of actions on the network data to identify network information comprises: performing the number of actions on the network data based on the initial network information to identify the network information.

In example 22, the subject matter of any one of Examples 19-21 can optionally include, the generating the metadata tag based on the network information further comprises: generating a number of fields associated with the network data; adding the network information to the number of fields to form the metadata tag.

In example 23, the subject matter of any one of Examples 19-22 can optionally include, further comprising: responsive to a determination that the destination for the network data is not within the set of destinations, removing the initial metadata tag; and transmitting the network data.

In example 24, the subject matter of any one of Examples 19-23 can optionally include, further comprising: determining whether the initial metadata tag is encrypted; responsive to a determination that the initial metadata tag is encrypted, decrypting the initial metadata tag; and encrypting the metadata tag prior to transmitting the network data and the metadata tag.

In example 25, the subject matter of any one of Examples 19-24 can optionally include, further comprising: generating an identifier for the network data; and encrypting the metadata tag using an encryption key and the identifier for the network data.

In example 26, the subject matter of any one of Examples 19-25 can optionally include, the number of actions is selected from a group consisting of: a) a virus scan; b) a protocol flow analysis; c) a host identification; d) sharing private data; and e) an intrusion protection scan.

In example 27, the subject matter of any one of Examples 19-26 can optionally include, the network information is selected from a group consisting of: a) at least one of a protocol flow information; b) a security risk analysis; c) an identification of a blocked source address; d) an antivirus scan result; and e) an intrusion protection scan result.

Example 38 is machine-readable storage including machine-readable instructions, when executed, to implement a method or realize an apparatus as claimed in any one of claims 1-9 and 19-22.

Example 29 is an apparatus comprising means for: receiving the network data; performing a number of actions on the network data to identify network information about the network data; determining whether a destination for the network data is within a set of destinations; and responsive to a determination that the destination for the network data is within the set of destinations: generating a metadata tag based on the network information; associating the metadata tag with the network data; and transmitting the network data with the metadata tag.

In example 30, the subject matter of Example 29 can optionally include, the means for receiving the network data comprises means for: receiving the network data with an initial metadata tag; and identifying initial network information from initial metadata tag.

In example 31, the subject matter of any one of Examples 29-30 can optionally include, the means for performing the number of actions on the network data to identify network information comprises means for: performing the number of actions on the network data based on the initial network information to identify the network information.

In example 32, the subject matter of any one of Examples 29-31 can optionally include, the means for generating the metadata tag based on the network information further comprises means for: generating a number of fields associated with the network data; and adding the network information to the number of fields to form the metadata tag.

In example 33, the subject matter of any one of Examples 29-32 can optionally include, further comprising means for: responsive to a determination that the destination for the network data is not within the set of destinations, removing the initial metadata tag; and transmitting the network data.

In example 34, the subject matter of any one of Examples 29-33 can optionally include, further comprising means for: determining whether the initial metadata tag is encrypted; responsive to a determination that the initial metadata tag is encrypted, decrypting the initial metadata tag; and encrypting the metadata tag prior to transmitting the network data and the metadata tag.

In example 35, the subject matter of any one of Examples 29-34 can optionally include, further comprising means for: generating an identifier for the network data; and encrypting the metadata tag using an encryption key and the identifier for the network data.

In example 36, the subject matter of any one of Examples 29-35 can optionally include, the number of actions is selected from a group consisting of: a) a virus scan; b) a protocol flow analysis; c) a host identification; d) sharing private data; and e) an intrusion protection scan.

In example 37, the subject matter of any one of Examples 29-36 can optionally include, the network information is selected from a group consisting of: a) at least one of a protocol flow information; b) a security risk analysis; c) an identification of a blocked source address; d) an antivirus scan result; and e) an intrusion protection scan result.

Example 38 is an apparatus for managing an application, comprising means for performing the method of any of claims 19 through 22.

In example 39, the subject matter of Example 38 can optionally include, the means for performing the method comprise a processor and a memory.

In example 40, the subject matter of any one of Examples 38-40 can optionally include, the memory comprises machine-readable instructions, that when executed cause the apparatus to perform the method of any of examples 17 through 27.

What is claimed is:

1. At least one non-transitory computer readable storage medium including code for execution by at least one processor to perform operations to:
    identify network information based, at least in part, on a result generated from performing one or more actions on network data received by a first network device;
    identify a second network device to receive the network data en route to a destination node from the first network device; and
    based, at least in part, on determining the second network device is within a specified group of network devices operable to perform actions on the network data:
        generate a metadata tag including data indicating the network information;
        add the metadata tag to the network data; and
        send the network data with the metadata tag to the second network device, wherein the metadata tag is encrypted prior to the network data with the metadata tag being sent to the second network device.

2. The at least one non-transitory computer readable storage medium of claim 1, including the code for execution by the at least one processor to perform further operations to:
    add the metadata tag to one or more headers associated with the network data.

3. The at least one non-transitory computer readable storage medium of claim 1, including the code for execution by the at least one processor to perform further operations to:
    add the metadata tag to content of the network data.

4. The at least one non-transitory computer readable storage medium of claim 1, including the code for execution by the at least one processor to perform further operations to:
    identify one or more modules of the second network device to perform at least one other action;
    identify one or more capabilities of each module, wherein the one or more capabilities indicate a type of the at least one other action to be performed; and
    add to the metadata tag at least some network information based on the type of the at least one other action to be performed.

5. The at least one non-transitory computer readable storage medium of claim 1, including the code for execution by the at least one processor to perform further operations to:
    obtain a prior result generated from previously performing the one or more actions on prior network data, the prior network data being a type similar to the network data received by the first network device.

6. The at least one non-transitory computer readable storage medium of claim 5, wherein a number of the one or more actions is reduced from a greater number of actions based, at least in part, on a combination of the prior result and initial network information in an initial metadata tag received by the first network device.

7. The at least one non-transitory computer readable storage medium of claim 1, including the code for execution by the at least one processor to perform further operations to:
receive the network data with an initial metadata tag;
identify initial network information from the initial metadata tag; and
perform the one or more actions on the network data based on the initial network information.

8. The at least one non-transitory computer readable storage medium of claim 7, including the code for execution by the at least one processor to perform further operations to:
based, at least in part, on determining the second network device is not within the specified group of network devices operable to perform actions on the network data, remove the initial metadata tag; and
transmit the network data without the metadata tag.

9. The at least one non-transitory computer readable storage medium of claim 1, wherein the one or more actions are selected from a group of actions, the group of actions including:
a) a virus scan;
b) a protocol flow analysis;
c) a host identification;
d) sharing private data; and
e) an intrusion protection scan.

10. The at least one non-transitory computer readable storage medium of claim 1, wherein the network information includes at least one of:
a) protocol flow information;
b) a security risk analysis;
c) an identification of a blocked source address;
d) an antivirus scan result; and
e) an intrusion protection scan result.

11. An apparatus, comprising:
a first network device including at least one hardware processor; and
logic coupled to the first network device, wherein the logic is configured for execution by the at least one hardware processor to:
identify network information based, at least in part, on a result generated from performing one or more actions on network data received by a first network device;
identify a second network device to receive the network data en route to a destination node from the first network device; and
based, at least in part, on determining the second network device is within a specified group of network devices operable to perform actions on the network data:
generate a metadata tag including data indicating the network information;
add the metadata tag to the network data; and
send the network data with the metadata tag to the second network device, wherein the metadata tag is encrypted prior to the network data with the metadata tag being sent to the second network device.

12. The apparatus of claim 11, wherein the logic is further configured for execution by the at least one hardware processor to:
add the metadata tag to content of the network data or add the metadata tag to one or more headers associated with the network data.

13. The apparatus of claim 11, wherein the logic is further configured for execution by the at least one hardware processor to:
identify one or more modules of the second network device to perform at least one other action;
identify one or more capabilities of each module, wherein the one or more capabilities indicate a type of the at least one other action to be performed; and
add to the metadata tag at least some network information based on the type of the at least one other action to be performed.

14. The apparatus of claim 11, wherein the logic is further configured for execution by the at least one hardware processor to:
obtain a prior result generated from previously performing the one or more actions on prior network data, the prior network data being a type similar to the network data received by the first network device.

15. The apparatus of claim 11, wherein the logic is further configured for execution by the at least one hardware processor to:
receive the network data with an initial metadata tag;
identify initial network information from the initial metadata tag; and
perform the one or more actions on the network data based on the initial network information.

16. The apparatus of claim 15, wherein the logic is further configured for execution by the at least one hardware processor to:
based, at least in part, on determining the second network device is not within the specified group of network devices operable to perform actions on the network data, remove the initial metadata tag; and
transmit the network data without the metadata tag.

17. A method, comprising:
identifying network information based, at least in part, on a result generated from performing one or more actions on network data received by a first network device;
identifying a second network device to receive the network data en route to a destination node from the first network device; and
based, at least in part, on determining the second network device is within a specified group of network devices operable to perform actions on the network data:
generating a metadata tag including data indicating the network information;
adding the metadata tag to the network data; and
sending the network data with the metadata tag to the second network device, wherein the metadata tag is encrypted prior to the network data with the metadata tag being sent to the second network device.

18. The method of claim 17, further comprising:
identifying one or more modules of the second network device to perform at least one other action;
identifying one or more capabilities of each module, wherein the one or more capabilities indicate a type of the at least one other action to be performed; and
adding to the metadata tag at least some network information based on the type of the at least one other action to be performed.

19. The method of claim 17, further comprising:
obtaining a prior result generated from previously performing the one or more actions on prior network data, the prior network data being a type similar to the network data received by the first network device.

20. The method of claim 17, wherein a number of the one or more actions is reduced from a greater number of actions based, at least in part, on a combination of the prior result and initial network information in an initial metadata tag received by the first network device.

21. The method of claim 17, further comprising:
adding the metadata tag either to content of the network data or to one or more headers associated with the network data.

22. The apparatus of claim 11, wherein a number of the one or more actions is reduced from a greater number of actions based, at least in part, on a combination of the prior result and initial network information in an initial metadata tag received by the first network device.

* * * * *

UNITED STATES PATENT AND TRADEMARK OFFICE
CERTIFICATE OF CORRECTION

PATENT NO.        : 9,838,434 B2
APPLICATION NO.   : 14/985524
DATED             : December 5, 2017
INVENTOR(S)       : Shivakumar Buruganahalli and Manuel Nedbal It is certified that error appears in the above-identified patent and that said Letters Patent is hereby corrected as shown below:

On the Title Page

Item "(74) Attorney, Agent, or Firm -": Delete "Goup" and insert -- Group --, therefor.

In the Claims

In Column 19, Line 59, in Claim 12, delete "logicis" and insert -- logic is, --, therefor.

Signed and Sealed this
Tenth Day of April, 2018

Andrei Iancu
*Director of the United States Patent and Trademark Office*